(12) United States Patent
Hori et al.

(10) Patent No.: US 8,033,138 B2
(45) Date of Patent: Oct. 11, 2011

(54) METHOD AND APPARATUS FOR BENDING A GLASS SHEET

(75) Inventors: Junji Hori, Chiyoda-ku (JP); Taisei Mori, Chiyoda-ku (JP); Masao Fukami, Chiyoda-ku (JP); Yutaka Kitajima, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 789 days.

(21) Appl. No.: 11/610,811

(22) Filed: Dec. 14, 2006

(65) Prior Publication Data

US 2007/0144211 A1 Jun. 28, 2007

(30) Foreign Application Priority Data

Dec. 14, 2005 (JP) ................................. 2005-360902

(51) Int. Cl.
*C03B 11/04* (2006.01)
*C03B 11/07* (2006.01)
(52) U.S. Cl. .......................................... 65/106; 65/291
(58) Field of Classification Search .................... 65/106, 65/291

See application file for complete search history.

(56) References Cited

U.S. PATENT DOCUMENTS

| | | | |
|---|---|---|---|
| 4,229,200 A | 10/1980 | Seymour | |
| 4,483,702 A | 11/1984 | Frank et al. | |
| 4,508,556 A * | 4/1985 | Bennett et al. | 65/25.4 |
| 4,516,997 A | 5/1985 | Derner et al. | |
| 5,376,158 A | 12/1994 | Shetterly et al. | |
| 5,669,952 A | 9/1997 | Claassen et al. | |
| 5,769,919 A | 6/1998 | Claassen et al. | |
| 6,227,008 B1 | 5/2001 | Shetterly et al. | |
| 6,318,125 B1 | 11/2001 | Diederen et al. | |
| 6,668,589 B1 * | 12/2003 | Mizusugi et al. | 65/106 |
| 2004/0107729 A1 | 6/2004 | Fukami et al. | |
| 2005/0138967 A1 | 6/2005 | Hori et al. | |

FOREIGN PATENT DOCUMENTS

EP 0 613 865 B1 9/1994

(Continued)

OTHER PUBLICATIONS

U.S. Appl. No. 11/847,650, filed Aug. 30, 2007, Fukami et al.

(Continued)

*Primary Examiner* — Matthew Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

It is an object of the present invention to provide a method for bending a glass sheet which can appropriately prevent cloth mark due to suctioning.

The present invention is characterized by a method for bending a glass sheet comprising a heating step for heating a glass sheet to soften the glass sheet, and a bending step for bending the heated and softened glass sheet to have a predetermined shape, wherein the bending step comprises a step of pressing the heated and softened glass sheet, whose edges are supported by a supporting frame, against a forming surface of a bending mold opposed to the supporting frame, and a vacuum forming step for providing a negative pressure through a plurality of suction holes formed on the forming surface so that the shape of the pressed glass sheet is bent along the forming surface of the mold, and wherein in the vacuum forming step, the plurality of suction holes are grouped into at least two groups, and the raised negative pressures for the respective groups are lowered at different timings.

8 Claims, 7 Drawing Sheets

FOREIGN PATENT DOCUMENTS

| | | |
|---|---|---|
| EP | 1 042 240 | 10/2000 |
| FR | 2 852 951 A1 | 10/2004 |
| JP | 6-256030 | 9/1994 |
| WO | WO 89/10330 | 11/1989 |
| WO | WO 00/23388 | 4/2000 |

OTHER PUBLICATIONS

U.S. Appl. No. 12/488,298, filed Jun. 19, 2009, Fukami et al.

U.S. Appl. No. 12/792,868, filed Jun. 3, 2010, Fukami et al.

* cited by examiner

METHOD AND APPARATUS FOR BENDING A GLASS SHEET

BACKGROUND OF THE INVENTION

Field of the Invention

The present invention relates to a method for bending a glass sheet, comprising a heating step for heating and softening the glass sheet and a bending step for bending the heated and softened glass sheet to have a predetermined shape.

Heretofore, as described in JP-A-6-256030, a method for bending a glass sheet is known, which is a method of heating a glass sheet to a temperature close to a softening point, suctioning the glass sheet to a surface of a vacuum mold to bend the glass sheet along the surface profile of the mold, wherein inside of the vacuum mold is divided into a plurality of vacuum chambers and suctions by these vacuum chambers are carried out at different timings, whereby the glass sheet is gradually formed from a specific portion.

However, if the timings of the suctions are shifted from each other like the above-mentioned prior art, a time from the start of the suction by the first vacuum chamber to completion of suction by the last vacuum chamber becomes long, a time of applying suction pressure to a portion of the glass sheet formed by the suction of the first vacuum chamber becomes excessively long, whereby through-the-glass image distortion (a mark of a mold cloth transferred to the glass, hereinafter referred to as "cloth mark") may occur in the portion.

SUMMARY OF THE INVENTION

To cope with this problem, it is an object of the present invention to provide a method and an apparatus for bending a glass sheet, which can appropriately prevent cloth mark of the glass sheet due to suctioning.

To solve the above problem, a first aspect of the present invention is characterized by a method for bending a glass sheet comprising a heating step for heating the glass sheet to soften the glass sheet, and a bending step for bending the heated and softened glass sheet to have a predetermined shape, wherein the bending step comprises a step of pressing the heated and softened glass sheet whose edges are supported by a supporting frame against a forming surface of a mold opposed to the supporting frame, and a vacuum forming step for providing a negative pressure through a plurality of suction holes formed on the forming surface so that the shape of the pressed glass sheet is bent along the forming surface of the mold, and wherein in the vacuum forming step, the plurality of suction holes are grouped into at least two groups, and the raised negative pressures for the respective groups are lowered at different timings.

A second aspect of the present invention is characterized by the method for bending a glass sheet according to the first aspect, wherein the negative pressure for a group for which the negative pressure is lowered earlier is subsequently maintained to be within a predetermined negative pressure range not causing cloth mark of the glass sheet until a negative pressure for a group for which the negative pressure is lowered latest is lowered.

A third aspect of the present invention is characterized by the method for bending a glass sheet according to the first aspect, wherein the plurality of suction holes are constituted by at least two groups is which are a group of the central portion of the forming surface of the mold and a group of the peripheral portion encompassing the group of the central portion, the group for which the negative pressure is lowered latest is the group of peripheral portion, and the negative pressure provided to the group for which the negative pressure is lowered earlier is subsequently maintained to be within a predetermined negative pressure range not causing cloth mark of the glass sheet until the negative pressure for the group of the peripheral portion is lowered to a predetermined negative pressure, and subsequently, the group for which the negative pressure is lowered earlier is released to the atmospheric pressure.

A fourth aspect of the present invention is characterized by an apparatus for bending a glass sheet, which is an apparatus for bending a glass sheet heated and softened in a heating furnace to have a predetermined shape, which comprises a supporting frame for supporting edges of the heated and softened glass sheet, a mold having a forming surface in which a plurality of suction holes are formed, a plurality of vacuum chambers provided on the back side of the forming surface of the mold and communicating with any one or more of the plurality of suction holes of the mold, a vacuum control unit connected with the plurality of vacuum chambers and for supplying negative pressures to the plurality of vacuum chambers, a controller for controlling the respective negative pressures of the plurality of vacuum chambers independently, and a mechanism for changing the position of the mold with respect to the supporting frame so that the glass sheet supported by the supporting frame is pressed against the forming surface of the mold, wherein the controller raises the negative pressures in the plurality of vacuum chambers so that the shape of the pressed glass sheet is bent along the forming surface of the mold, and the raised negative pressures for the respective vacuum chambers are lowered at different timings.

A fifth aspect of the present invention is characterized by the apparatus for bending a glass sheet according to the fourth aspect, wherein the controller maintains the pressure in the vacuum chamber in which the negative pressure is lowered earlier, to be subsequently within a predetermined negative pressure range not causing cloth mark of the glass sheet until the negative pressure in the vacuum chamber in which the negative pressure is lowered latest is lowered.

A sixth aspect of the present invention is characterized by the apparatus for bending a glass sheet according to the fourth aspect, wherein the plurality of vacuum chambers are constituted by at least two vacuum chambers which are a vacuum chamber for the central portion of the forming surface of the mold and a vacuum chamber for the peripheral portion encompassing the is vacuum chamber of the central portion, the controller lowers the pressure in the vacuum chamber of the peripheral portion latest, and the controller maintains the pressure in the vacuum chamber of the central portion in which the negative pressure is lowered earlier, to be subsequently within a predetermined negative pressure range not causing a cloth mark of the glass sheet until the pressure in the vacuum chamber of the peripheral portion is lowered to a predetermined negative pressure, and subsequently, the negative pressure in the vacuum chamber for which the negative pressure is lowered earlier is released to an atmospheric pressure.

According to the first aspect of the present invention, a plurality of suction holes are grouped into at least two groups and it is possible to lower negative pressures of the respective groups at appropriate timings, and to appropriately prevent cloth mark of a glass sheet.

According to the second aspect of the present invention, it is possible to maintain a negative pressure for a group for which the negative pressure is lowered, to be subsequently within an appropriate negative pressure range, and to appropriately prevent cloth mark of a glass sheet.

According to the third aspect of the present invention, a glass sheet is held in a mold by a negative pressure for a group of the peripheral portion, and a plurality of suction holes of a group in the central portion are released to the atmospheric pressure, whereby it is possible to appropriately prevent cloth mark of the glass sheet. Further, it is preferred that the group in the peripheral portion is provided so as to correspond to the region of the glass sheet where a black ceramic paste layer is formed. Since the cloth mark of the glass sheet does not show up in the region where a black ceramic paste layer is formed as compared with a visible region in the central portion of the glass sheet, it is possible to make the negative pressure for the group in the peripheral region higher than the negative pressure for the group in the central region. Accordingly, it is possible to further reduce the negative pressure applied to the visible region of the glass sheet when the glass sheet is held in the mold, and to appropriately prevent cloth mark of the glass sheet.

According to the fourth aspect of the present invention, in the same manner as the first aspect of the present invention, it is possible to lower the raised negative pressures in the vacuum chambers at respective appropriate timings for the vacuum chambers, and to appropriately prevent cloth mark of the glass sheet.

According to the fifth aspect of the present invention, in the same manner as the second aspect of the present invention, it is possible to maintain the pressure of a vacuum chamber, whose negative pressure is lowered, to be subsequently within an appropriate negative pressure range and to thereby appropriately prevent cloth mark of the glass sheet.

According to the sixth aspect of the present invention, in the same manner as the third aspect of the present invention, a glass sheet is held in a mold by a negative pressure of a vacuum chamber for the peripheral portion, and a plurality of suction holes of a vacuum chamber for the central portion are released to the atmospheric pressure, whereby it is possible to appropriately prevent cloth mark of the glass sheet. Further, the vacuum chamber for the peripheral portion is preferably provided so as to correspond to a region of the glass sheet where a black ceramic paste layer is formed. Since a cloth mark of a glass sheet does not show up in the region where the black ceramic paste layer is formed as compared with a visible region in the central portion of the glass sheet, it is possible to make the negative pressure in the vacuum chamber for the peripheral portion higher than the negative pressure in the vacuum chamber in the central portion. Accordingly, at a time of holding the glass sheet in the mold, it is possible to further reduce the negative pressure applied to the visible region of the glass sheet, and to appropriately prevent cloth mark of the glass sheet.

BRIEF DESCRIPTION OF THE DRAWINGS

Now, the present invention will be described in detail with reference to the preferred embodiments.

In the accompanying drawings.

DETAILED DESCRIPTION OF THE PREFERRED EMBODIMENTS

Figure 1:
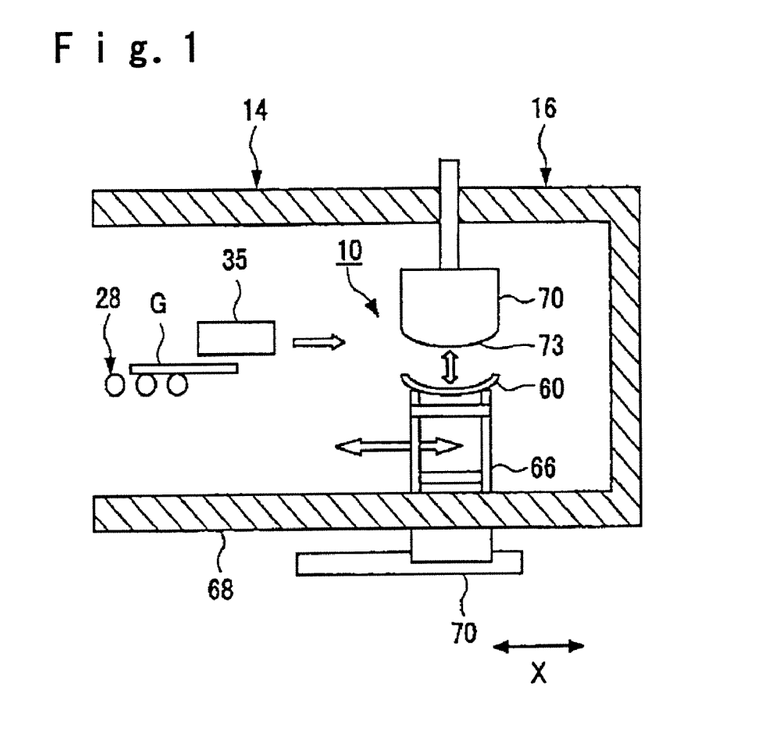
FIG. 1 is a cross sectional view schematically showing an example of main portion of the production line including the bending apparatus 10 of a glass sheet of the present invention.

FIG. 1 schematically shows an example of a main production line portion including a bending apparatus 10 for a glass sheet of the present invention. As shown in FIG. 1, a flat glass sheet G cut into predetermined size and shape, is heated and softened in a heating furnace 14 and conveyed by a roller conveyor 28 to the forming furnace 16 as the heated and softened state is maintained. The glass sheet G is positioned as it is suctioned and held by a flat mold 35, and is conveyed into the forming furnace 16.

In the forming furnace 16, a supporting frame 60 is standing by at a receiving position, when the glass sheet G is positioned above the supporting frame 60, the movement of the flat mold 35 is stopped and the suction holding is released, whereby the glass sheet G is placed on the supporting frame 60. Thereafter, when the supporting frame 60 moves to a position under a mold 70, the mold 70 moves down, whereby the glass sheet G is pressed by the supporting frame 60 and the mold 70, to be formed into a predetermined curved shape. Here, detail of the forming method is described later. The formed glass sheet G is conveyed out of the forming furnace 16 by e.g. a quench ring (not shown), and tempered by cooling to be a tempered glass. Here, the flat mold 35 may have a length of from a down stream side of the roller conveyor 28 to the receiving position of the supporting frame 60, and in this case, it is not necessary to move the flat mold 35.

Figure 2:
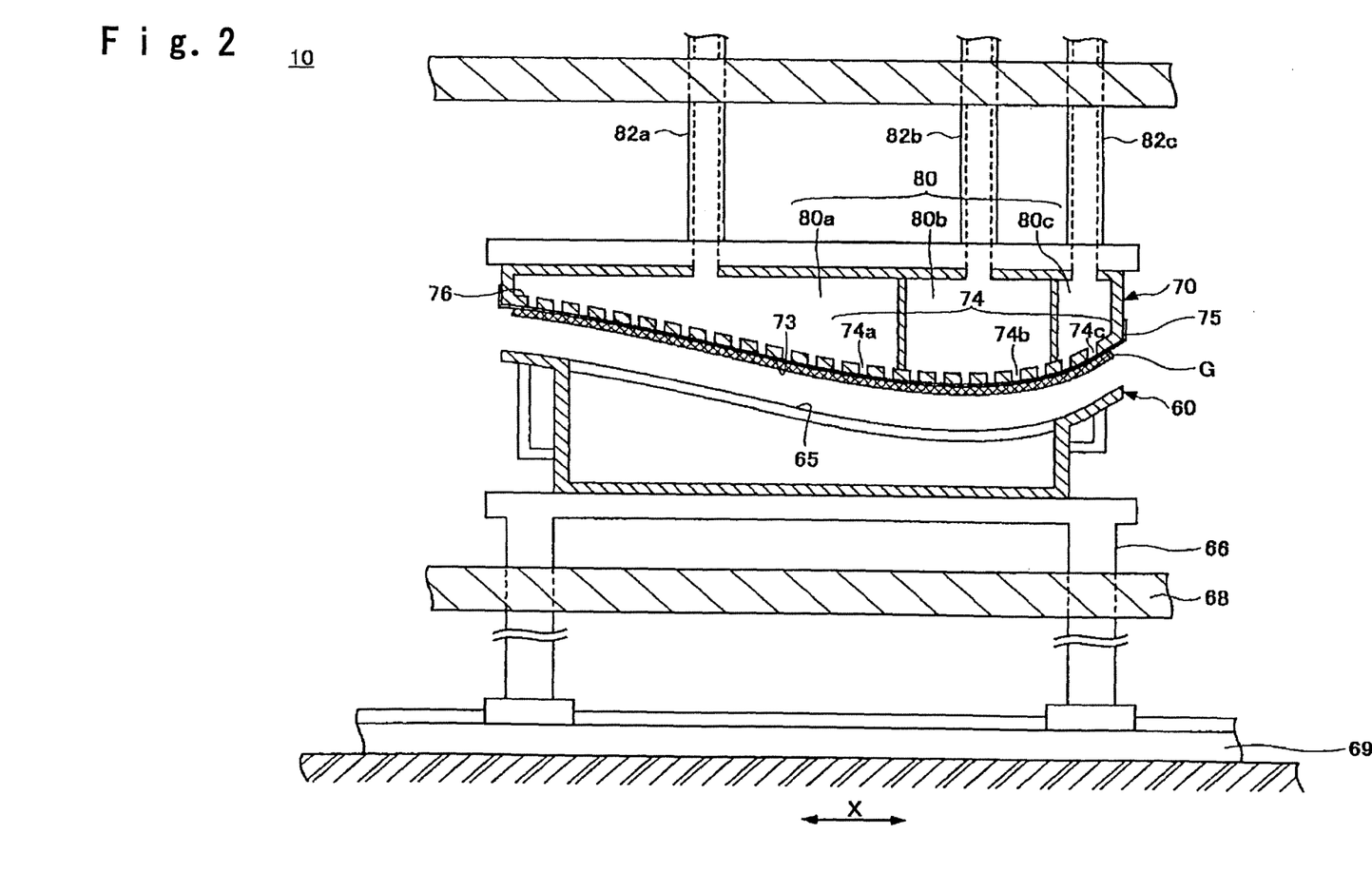
FIG. 2 is a cross sectional view showing an example of the bending apparatus 10 of a glass sheet according to the present invention.

FIG. 2 shows an example of constituents of the bending apparatus 10 of a glass sheet disposed in the forming furnace 16. The bending apparatus 10 of a glass sheet of this example, is provided with the above-mentioned supporting frame 60 and the mold 70.

The supporting frame 60 is formed to have a shape adapted to the outline of the glass sheet G so as to support the periphery (edge or its vicinity) of the glass sheet G. Namely, the supporting frame 60 has a supporting surface 65 for supporting the periphery of the glass sheet G, and the supporting surface 65 has a shape that is substantially a mirror image of the forming surface 73 of the mold 70. The supporting frame 60 may support entire perimeter of the glass sheet, or may support a part of the entire perimeter. Further, the supporting frame 60 is disposed on a shuttle 66 constituted by steel members. The leg portion of the shuttle 66 extends to the underneath of a furnace floor 68 through a slit (not shown) of the furnace floor, and is supported by a rail 69 so as to be movable in X direction.

The mold 70 is attached to a ceiling portion of the forming furnace 16 via elevating means (for example, a hydraulic cylinder) so as to be movable up and down. A forming surface 73 of the mold 70 is formed to have a plane size corresponding to substantially entire surface of the glass sheet G. Further, as shown in FIG. 2, on the forming surface 73 having a curved vertical cross section, a plurality of suction holes 74 are densely formed over substantially entire surface.

The forming surface 73 of the mold 70 is substantially entirely covered with a cloth 75 (a surface member such as a metal cloth or a glass cloth). The cloth 75 is latched to e.g. a side portion of the mold 70 by e.g. a hook. The cloth 75 covers the suction holes 74 to prevent transferring of the shape of the suction holes 74 to the surface of the glass sheet G when the glass sheet is suctioned, and to increase utilization efficiency of negative pressure source. Further, the cloth 75 may be held by the negative pressure so as to be adapted to the forming surface 73.

A vacuum chamber portion 80 for the mold 70, is constituted by a plurality of vacuum chambers (in this example, three vacuum chambers consisting of vacuum chambers 80a, 80b and 80c). The plurality of vacuum chambers 80a, 80b and 80c are disposed on the back side of the forming surface 73 so as to cover substantially entire region of the forming surface 73 of the mold 70, and the chambers are partitioned from each other by e.g. a wall to ensure complete air tightness.

The plurality of vacuum chambers 80a, 80b and 80c are each communicates with any one or more of the plurality of suction holes 74. In the example shown in FIG. 2, for a region of the forming surface 73 performing the deepest draw, a vacuum chamber 80b is allocated, and for regions of the forming surface 73 on both sides, vacuum chambers 80a and 80b are allocated. Accordingly, the vacuum chambers 80a, 80b and 80c communicate with suction holes 74 in respective regions of the forming surface 73 where the respective vacuum chambers are allocated. Here, from now, for convenience of explanation, regions of the forming surface 73 for which the vacuum chambers 80a, 80b and 80c are allocated are designated as reference numerals 73a, 73b and 73c (refer to FIG. 4) respectively, and for suction holes 74 of the respective groups for which the vacuum chamber 80a, 80b and 80c are allocated are designated as reference numerals 74a, 74b and 74c respectively.

To the vacuum chambers 80a, 80b and 80c, a chamber pressure controller 100 disposed outside the forming furnace 16 is connected via ducts 82a, 82b and 82c respectively.

Figure 3:
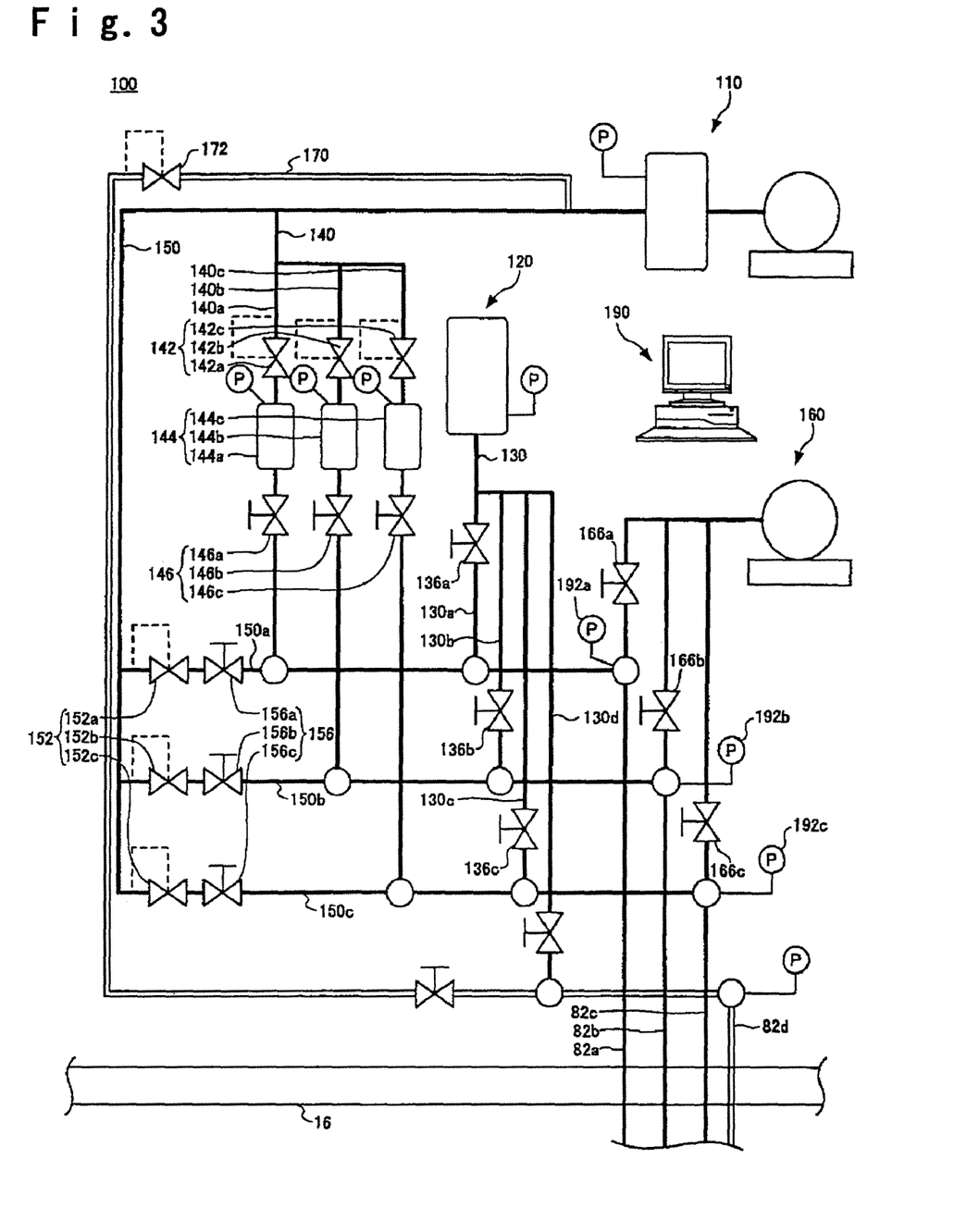
FIG. 3 is a piping diagram showing the construction of the main portion of the chamber pressure controller 100.

FIG. 3 is a piping diagram showing main construction of the chamber pressure controller 100 (constituents of the forming apparatus of a glass sheet disposed outside the forming furnace 16). The chamber pressure controller 100 is provided with a vacuum source (negative pressure source) 110 and a blow source 120.

The vacuum source (negative pressure source) 110 is constituted by a vacuum pump and a receiver tank, and the receiver tank is maintained to have a negative pressure adjusted to be a predetermined pressure (for example, −8,000 mmAq). The blow source 120 is constituted by a compressor and a receiver tank, and the receiver tank is maintained to have a positive pressure adjusted to a predetermined pressure (for example, 2,000 mmAq). Here, the negative pressure and the positive pressure are based on the atmospheric pressure, and in this specification and the claims, "negative pressure is high" means that the absolute value of the negative pressure is large. Accordingly, "increase negative pressure" means to increase the absolute value of the negative pressure, and "decrease negative pressure" means to decrease the absolute value of the negative pressure.

The negative pressure from the vacuum source 110 is supplied to each of the vacuum chambers 80a, 80b and 80c (ducts 82a, 82b and 82c) independently. Namely, a negative pressure supply line from the vacuum source 110 is branched to three lines to be connected with the vacuum chambers 80a, 80b and 80c respectively.

In the same manner, the positive pressure from the blow source 120 is supplied to each of the vacuum chambers 80a, 80b and 80c (ducts 82a, 82b and 82c) independently. Namely, a positive pressure line 130 from the blow source 120 branches to three positive pressure supply lines 130a, 130b and 130c to be connected with the vacuum chambers 80a, 80b and 80c respectively. The positive pressure supply lines 130a, 130b and 130c are provided with open/close valves (dampers) 136a, 136b and 136c to control communication state with the vacuum chambers 80a, 80b and 80c respectively.

In this example, to each of the vacuum chambers 80a, 80b and 80c, two systems of negative pressure lines, namely, a first negative pressure supply line 140 and a second negative pressure supply line 150 are provided. The first negative pressure supply line 140 is, as described later, a system for supplying relatively high negative pressure required for forming a glass sheet G by suctioning, and the second negative pressure supply line 150 is a system for supplying relatively low negative pressure for preventing occurrence of cloth mark of a glass sheet G.

Specifically, the first negative pressure supply line 140 connects the vacuum source 110, a regulator 142, a buffer tank 144, an open/close valve (damper) 146 and a vacuum chamber 80 in series. Namely, a first negative pressure supply line 140a for the vacuum chamber 80a connects the vacuum source 110, a regulator 142a, a buffer tank 144a, an open/close valve 146a and a duct 82a in series. In the same manner, a first negative pressure supply line 140b for the vacuum chamber 80b connects the vacuum source 110, a regulator 142b, a buffer tank 144b, an open/close valve 146b and a duct 82b in series. In the same manner, a first negative pressure supply line 140c for the vacuum chamber 80c connects the vacuum source 110, a regulator 142c, a buffer tank 144c, an open/close valve 146c and a duct 82c in series. Negative pressures maintained in the buffer tanks 144a, 144b and 144c are adjusted to negative pressures (for example from −1,500 to −2,500 mmAq) for vacuum forming to be described later by corresponding regulators 142a, 142b and 142c respectively. Here, as evidenced by FIG. 3, the magnitude of the negative pressures maintained in the buffer tanks 144a, 144b and 144c are independent from one another and optionally adjusted by the regulators 142a, 142b and 142c respectively.

The second negative pressure supply line 150 connects the vacuum source 110, a regulator 152, an open/close valve (damper) 156 and the vacuum chamber 80 in series. Namely, a second negative pressure supply line 150a for the vacuum chamber 80a connects the vacuum source 110, a regulator 152, an open/close valve 156a and a duct 82a in series. In the same manner, a second negative pressure supply line 150b for the vacuum chamber 80b connects the vacuum source 110, a regulator 152b, an open/close valve 156b and a duct 82b in series. In the same manner, a second negative pressure supply line 150c for the vacuum chamber 80c connects the vacuum source 110, a regulator 152c, an open/close valve 156c and a duct 82c in series.

Thus, in this example, to each of the vacuum chambers 80a, 80b and 80c, two systems of negative pressure supply lines 140 and 150 and positive pressure supply line 130 can selectively communicate. Selections of supply lines to communicate with the vacuum chambers 80a, 80b and 80c, is achieved by open/close control of the respective open/close valves 136, 146 and 156 provided the most down stream side of the respective supply line. Open/close control (selection of supply lines) of the open/close valves 136, 146 and 156 and pressure control of the regulators 142 and 152 are achieved by a controller 190.

To the controller 190, as shown in FIG. 3, pressure sensors provided in the buffer tanks 144a, 144b and 144c, and pressure sensors for measuring the pressures of the vacuum chambers 80a, 80b and 80c (pressures in the ducts 82a, 82b and 82c in this example) are connected.

To the controller 190, also a line control PLC (programmable logic controller) (not shown) being a sequencer for controlling e.g. up-down operation of the mold 70, is connected. The controller 190 controls various types of operations of the bending apparatus 10 to be described later, based on e.g. outputs of pressure sensors and in corporation with the line controller PLC.

Figure 4A:
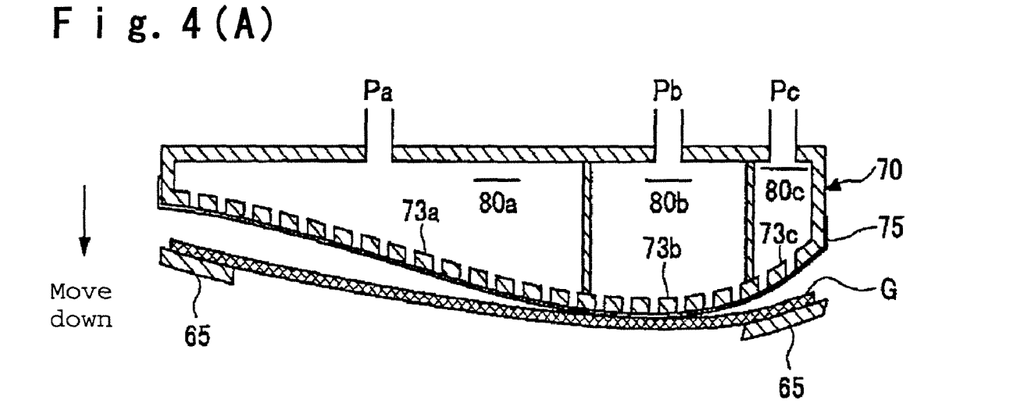
FIGS. 4(A) to 4(C) are views sequentially showing the bending method of a glass sheet realized by the bending apparatus 10 of the present invention.
Figure 4B:
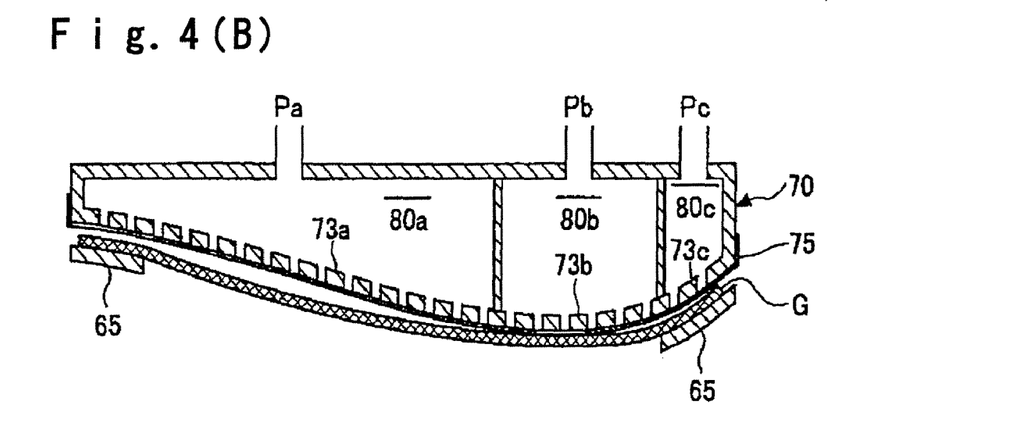
Figure 4C:
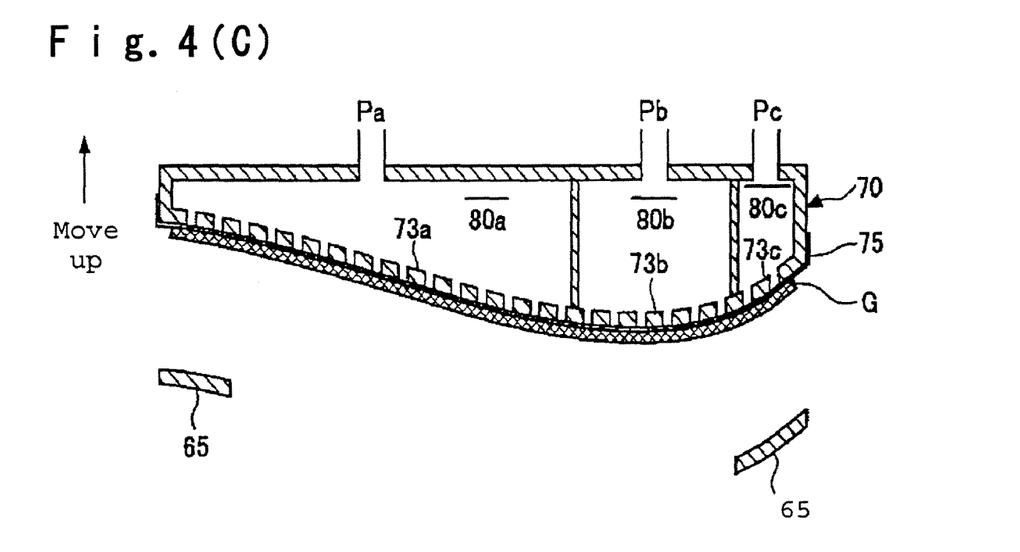

FIGS. 4(A) to 4(C) are views sequentially showing a bending method of a glass sheet achieved by the bending apparatus 10 of the present invention. Specifically, FIG. 4(A) shows a first stage in which the mold 70 moves down so that the forming surface 73b (an area of the forming surface 73 performing the deepest drawing) is pressed against a glass sheet G placed on a supporting frame 60, FIG. 4(B) shows a second stage in which the mold 70 is at a final forming position (the lowest position), and FIG. 4(C) shows a third stage in which the mold moves up as it suctions and holds the glass sheet G after completion of forming.

Figure 5:
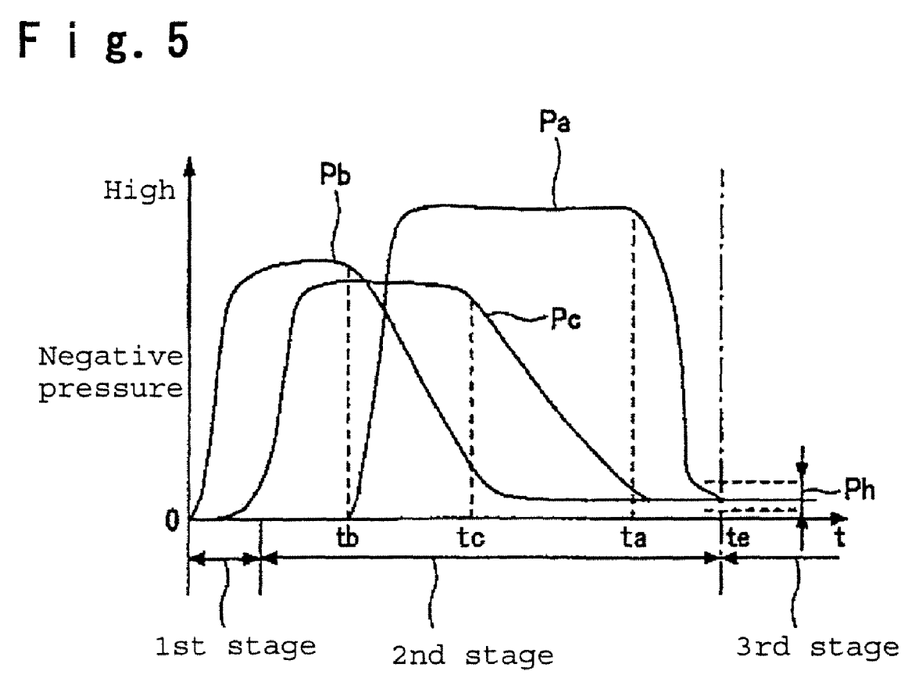
FIG. 5 is a graph sequentially showing the nature of change of negative pressures of the vacuum chambers 80a, 80b and 80c of this example.

FIG. 5 sequentially shows the nature of change of negative pressures in the vacuum chambers 80a, 80b and 80c in the process from the first stage to the third stage. Horizontal axis (time axis) of FIG. 5 represents an example of time zones corresponding to the stages shown in FIGS. 4(A) to 4(C). In FIG. 5, Pa shows a negative pressure of the vacuum chamber 80a, Pb shows a negative pressure of the vacuum chamber 80b, and Pc shows a negative pressure of the vacuum chamber 80c. Here, the nature of the change of suction pressures applied to the glass sheet G via the suction holes 74a, 74b and 74c of the respective groups, are substantially the same as the nature of the change of the negative pressures of the vacuum chambers 80a, 80b and 80c.

First of all, the glass sheet G is passed from a flat mold 35 and placed on a supporting frame 60, and when the supporting frame 60 moves to a position facing to the mold 70, the mold 70 starts moving down, and accordingly, as shown in FIG. 4(A), a part of the glass sheet G supported by the supporting frame 60 is pressed against the forming surface 73b of the mold, whereby forming of the glass sheet G is started.

Approximately at the same time, (or from just before a part of the glass sheet G is pressed against the forming surface 73b of the mold 70), as shown in FIG. 5, negative pressure of the vacuum chamber 80b is increased. Namely, the open/close valve 146b in the first negative pressure line 140b for the vacuum chamber 80b opens, whereby negative pressure in the buffer tank 144b is supplied to the vacuum chamber 80b and negative pressure Pb of the vacuum chamber 80b increases. Accordingly, suction pressure applied to the glass sheet G via suction holes 74b communicating with the vacuum chamber 80b increases, and the glass sheet G is suctioned against the forming surface 73b of the mold 70, whereby forming of the glass sheet G along the forming surface 73b of the mold 70 is facilitated. Here, from now, forming of the shape of the glass sheet G along the forming surface 73 of the mold 70 by a suction pressure applied to the glass sheet G through the suction holes 74, is referred also to as "vacuum forming".

Here, at this stage, to other vacuum chambers 80b and 80c, a cloth vacuum source 160 (refer to FIG. 3) is connected. The cloth vacuum source 160 supplies a low negative pressure (for example, −50 mmAq) in a level capable of suctioning a cloth 75 to the forming surface 73b of the mold 70. The cloth vacuum source 160 is connected to the vacuum chambers 80a, 80b, and 80c via cloth vacuum valves 166a, 166b, and 166c, respectively.

Then, when the mold 70 gradually moves down, as shown in FIG. 4(B), the mold 70 reaches the final forming position (the lowest position). The mold 70 is maintained at the final forming position for a predetermined time. Accordingly, substantially entire surface of the glass sheet G supported by the supporting frame 60 is pressed against the forming surface 73 of the mold, whereby the glass sheet G is entirely formed.

In this predetermined time (during the second stage), as shown in FIG. 5, first of all, negative pressure of the vacuum chamber 80c is increased. Namely, communication between the vacuum chamber 80c and the cloth vacuum source 160 is shut off, and an open/close valve 146c in the first negative pressure supply line 140c for the vacuum chamber 80c opens, whereby negative pressure in the buffer tank 144c is supplied to the vacuum chamber 80c and the negative pressure Pc in the vacuum chamber 80c increases. Accordingly, suction pressure applied to the glass sheet G through the suction holes 74c communicating with the vacuum chamber 80c, increases, and the glass sheet G is suctioned against the forming surface 73c of the mold 70, whereby forming of the glass sheet G along the forming surface 73c of the mold 70 is facilitated. Then, after a time difference after the open/valve 146c in the first negative pressure supply line 140c opens, vacuum pressure in the vacuum chamber 80a is increased. Namely, communication between the vacuum chamber 80a with the cloth vacuum source 160 is shut off and an open/close valve 146a in the first negative pressure line 140a for the vacuum chamber 80a opens, whereby negative pressure in the buffer tank 144a is supplied to the vacuum chamber 80a and negative pressure Pa in the vacuum chamber 80a increases. Accordingly, suction pressure applied to the glass sheet G through suction holes 74c communicated with the vacuum chamber 80a, increases, whereby the glass sheet G is suctioned to the forming surface 73a of the mold 70, and forming of the glass sheet G along the forming surface 73a of the mold 70 is facilitated.

Thus, in this example, by supplying a predetermined high negative pressure to the plurality of vacuum chambers 80a, 80b and 80c at different timings, it is possible to efficiently form the glass sheet G along the forming surface 73 of the mold 70 without applying excessive load to the glass sheet G.

Here, in the above-mentioned example, as shown also in FIG. 5, timings of supplying negative pressures for vacuum forming to the vacuum chambers 80a, 80b and 80c, are specified in conjunction with the position of the glass sheet G in relation to the forming surface 73 of the mold 70, but the timings have to be accommodated to e.g. the shape of the forming surface 73 of the mold 70 or the magnitude of necessary suction pressure, and is not limited to the above-mentioned suction start timing in the present invention.

By the way, as described above, if the time difference is provided between the plurality of vacuum chambers 80a, 80b and 80c, a time from start of vacuum forming by the first vacuum chamber 80b to completion of vacuum forming by the last vacuum chamber 80a becomes long, and thus, a time of applying suction pressure to a portion of a glass sheet (a portion of the glass sheet pressed against the forming surface 73b of the mold 70) suction-formed by the first vacuum chamber 80b, becomes long, which may cause cloth mark (particularly, cloth mark caused by transferring of the surface shape of the cloth 75) in the portion.

To cope with this problem, in this example, as shown in FIG. 5, negative pressures of the vacuum chambers 80a, 80b and 80c are raised and independently lowered as described above. The timings of lowering are timings at which a time required for vacuum forming by the respective vacuum chambers 80a, 80b and 80c elapse, and they are appropriately determined for the respective vacuum chambers 80a, 80b and 80c.

Specifically, as shown in FIG. 5, at a timing (time tb in FIG. 5) at which the negative pressure in the vacuum chamber 80b is increased to a predetermined negative pressure for vacuum forming and a time required for vacuum forming elapse, the open/close valve 146b in the first negative pressure supply line 140b for the vacuum chamber 80b is closed and the open/close valve 156b in the second negative pressure supply line 150b for the vacuum chamber 80b is opened. At this time, high negative pressure that has been supplied to the vacuum chamber 80b, is weakened to a predetermined negative pressure range Ph by a regulator 152b (weakened by introducing atmospheric pressure by the regulator 152b). The predetermined negative pressure range Ph is a negative pressure range in which cloth mark of the glass sheet G by e.g. the cloth 75 is not generated, and is, for example, from −300 to −50 [mmAq] The negative pressure may be gradually lowered at a predetermined speed (for example, 333 mmAq/sec) by the regulator 152b so that the negative pressure is quickly lowered to the negative pressure range Ph. The negative pressure of the vacuum chamber 80b thus lowered is maintained to the predetermined negative pressure range Ph at least until lowering of negative pressure in the vacuum chamber 80a in which the negative pressure lower latest, completes (at least until a time te of FIG. 5).

In the same manner, at a timing (time tc of FIG. 5) at which the negative pressure in the vacuum chamber 80c is increased to a predetermined negative pressure for vacuum forming and a time required for vacuum forming elapses, an open/close valve 146c in the first negative pressure supply line 140c for the vacuum chamber 80c is closed, and an open/close valve 156c in the second negative pressure supply line 150c for the vacuum chamber 80c is opened. At this time, high negative pressure that has been supplied to the vacuum chamber 80c is weakened to the same predetermined negative pressure range Ph by a regulator 152c. The negative pressure in the vacuum chamber 80 thus lowered is maintained within the predetermined negative pressure range Ph at least until lowering of negative pressure in the vacuum chamber 80a in which the negative pressure lowers latest, completes (at least until a time te of FIG. 5).

In the same manner, at a timing (time ta in FIG. 5) at which the negative pressure in the vacuum chamber 80a is increased to a predetermined negative pressure for vacuum forming and a time required for vacuum forming elapses, an open/close valve 146a in the first negative pressure supply line 140a for the vacuum chamber 80a is closed and an open/close valve 156a in the second negative pressure supply line 150a for the vacuum chamber 80a is opened. At this time, high pressure that has been supplied to the vacuum chamber 80a, is weakened to the same predetermined negative pressure range Ph by the regulator 152a.

Here, when the lowering of negative pressure in the is vacuum chamber 80a in which the negative pressure lowers latest, thus completes (time te of FIG. 5), the forming step is completed, and as shown in FIG. 4(C), the mold 70 moves up in a state that the formed glass sheet G is suctioned and held by the forming surface 73. The mold 70 transfers the formed glass sheet G to subsequent step (for example, quench ring), and completes forming operation to the glass sheet G. Specifically, open/close valves 156a, 156b and 156c in the second negative pressure supply lines 150a, 150b and 150c for the vacuum chambers 80a, 80b and 80c respectively are closed, and open/close valves (dampers) 136a, 136b and 136c are opened so that the vacuum chambers 80a, 80b and 80c communicate with positive pressure supply lines 130a, 130b and 130c respectively. As a result, positive pressure is supplied to the vacuum chambers 80a, 80b and 80c, and negative pressures in the vacuum chambers 80a, 80b and 80c deviate from the above-mentioned vacuum pressure range Ph, whereby the glass sheet that has been suctioned and held, drops. At this time, the glass sheet G is received by e.g. a quench ring that has moved to a position right under the mold 70, whereby the glass sheet G is conveyed to subsequent step.

Figure 9:
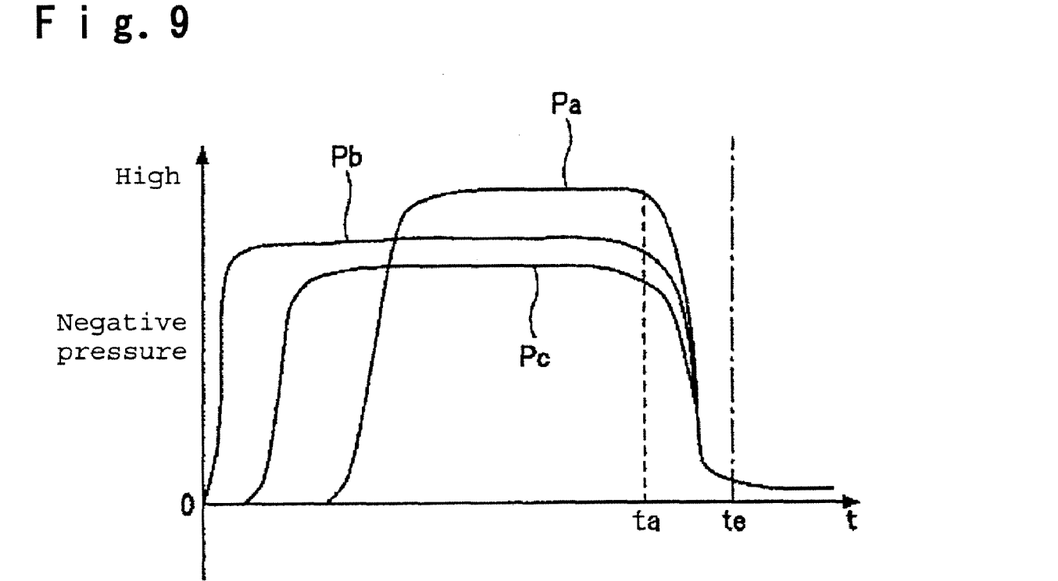
FIG. 9 is a graph sequentially showing the nature of change of negative pressures of the vacuum chambers 80a, 80b and 80c in a conventional construction.

As described above, according to this example, negative pressures in the vacuum chambers 80a, 80b and 80c that have been raised to a negative pressure required for vacuum forming, are sequentially lowered at timings (times ta, tb and tc) at which the respective times required for vacuum forming elapse, and as a result, lowerings of negative pressures start with time differences from one another (ta-tb, ta-tc etc.). Accordingly, it is possible to prevent cloth mark of the glass sheet G due to e.g. a cloth 75 that may be caused by maintaining high negative pressure for a long time more than required. On the other hand, for example, in a conventional construction in which, at a timing (time ta of FIG. 9) at which a time required for vacuum forming by the last vacuum chamber 80a elapses, supply of negative pressure to all of the vacuum chambers 80a, 80b and 80c is released at the same time and supply of positive pressure starts to transfer the glass sheet to subsequent steps as shown in FIG. 9, high negative pressure for vacuum forming is maintained for a long time more than required in vacuum chambers 80b and 80c other than the vacuum chamber 80a, which may cause cloth mark of the glass sheet G by the cloth 75.

Here, in this example, since times required for vacuum formings using vacuum chambers 80a, 80b and 80c, depend on e.g. the shape of the forming surface 73 of the mold 70 or the magnitude of suction pressure, they are parameters that should be accommodated or obtained by e.g. calculation or experiment. Further, e.g. open/close of the open/close valves 136, 146 and 156 (namely, switching of supply lines) may be feedback controlled by a controller 190 according to deviation of output signals of e.g. pressure sensors 192a, 192b and 192c from the respective target values, or they may be feedforward controlled according to open/close timings obtained in advance.

Further, in this example, the order of lowering negative pressures for the vacuum chambers 80a, 80b and 80c, is equal to the order of increasing negative pressures for the vacuum chambers 80a, 80b and 80c, but the timing of lowering negative pressures is determined based on minimum durations required for achieving desired vacuum forming, and accordingly, the timings depend on e.g. the shape of the forming surface 73 of the mold 70 or the magnitude of necessary suction pressure, and there is a case where timings of lowering negative pressures for two vacuum chambers become substantially at the same time or a case where the order of increasing the negative pressures and the order of lowering the negative pressures become opposite.

Then, another embodiment of the present invention is described. The basic construction of e.g. the bending apparatus 10 of a glass sheet is the same as that of FIG. 1, and detailed explanation about common portions is omitted. In the following, construction of each portion is described in detail, but in the following explanation, portions in common with the above embodiment are designated by the same reference numerals as those of the above embodiments.

Figure 6:
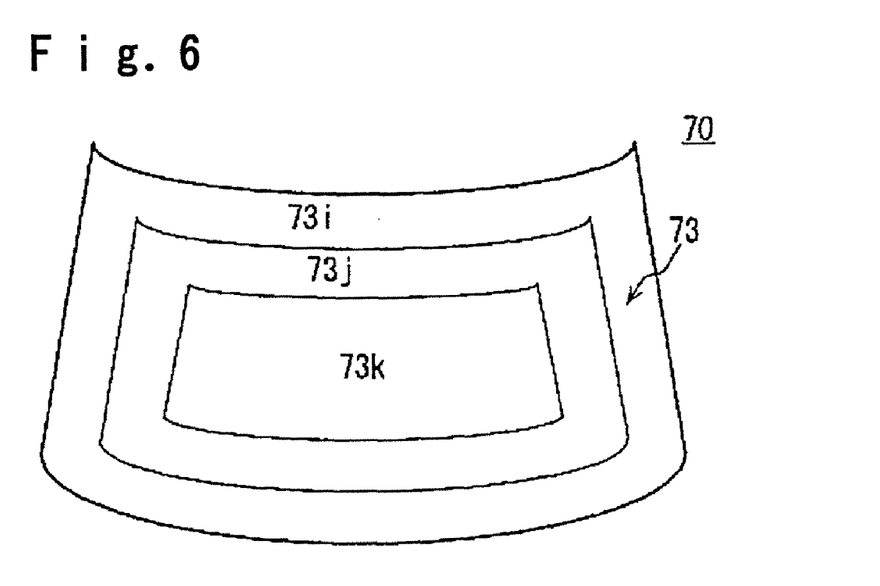
FIG. 6 is a plan view showing division of the forming surface of the mold 70 of another example of the present invention.

In the mold 70 in this example, partitioning positions of vacuum chambers are different from those of the vacuum chambers 80*a*, 80*b* and 80*c* in FIG. 2. and thus, explanation is made using FIG. 6. FIG. 6 shows a forming surface 73 in a plan view of the mold 70, and shows that the forming surface 73 is divided into three regions. Here, the forming surface 73 has a shape whose vertical cross section is curved, and a plurality of suction holes 74 are densely formed substantially over the entire surface, but they are omitted in FIG. 6. Further, the forming surface 73 may be covered with a cloth (a surface member such as a metal cloth or a glass cloth).

Three regions of the forming surface 73 consist of a central forming surface 73*k*, an inner forming surface 73*j* and a peripheral forming surface 73*i*, and the forming surface 73 is divided into these regions so that the peripheral forming surface 73*i* encompass the inner forming surface 73*j* and the central forming surface 73*k*. The central forming surface 73*k* and the inner forming surface 73*j* correspond to visible light transmission region of a glass sheet, and the peripheral forming surface 73*i* correspond to a black ceramic paste layer formed in the peripheral portion of the glass sheet. The three forming surfaces thus divided are connected with vacuum chambers of the mold 70 (a vacuum chamber, not shown, is divided in the same manner as FIG. 2, and thus divided vacuum chambers to be connected with the forming surfaces 73*i*, 73*j* and 73*k* are designated as 80*i*, 80*j* and 80*k* respectively), the vacuum chambers 80*i*, 80*j* and 80*k* each communicates with a plurality of suction holes 74.

Figure 7:
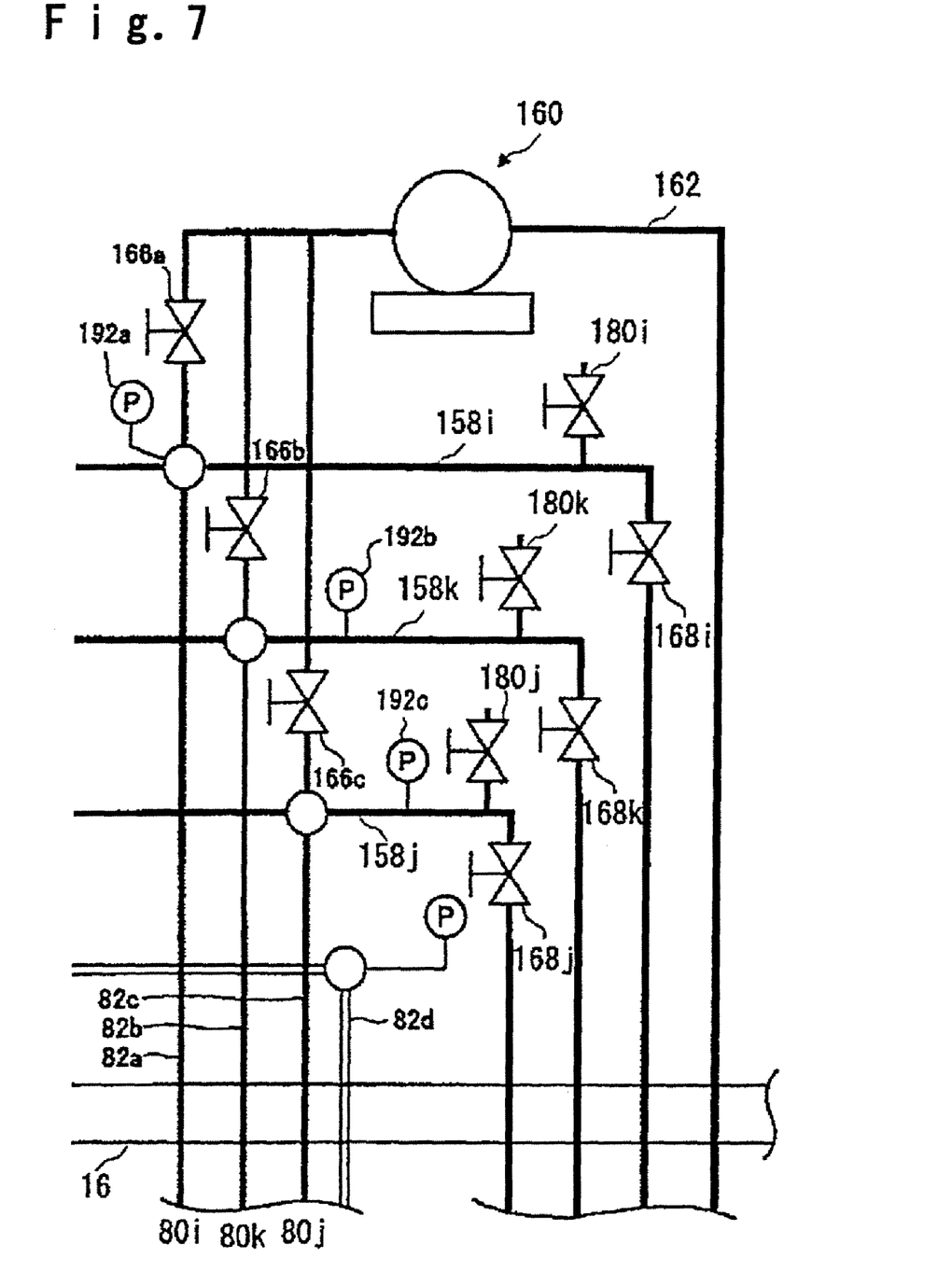
FIG. 7 is a piping diagram showing an atmospheric pressure release line portion of the chamber pressure controller 100 of another embodiment of the present invention.

Thus, the vacuum chamber is divided into three vacuum chambers, and the divided vacuum chambers are disposed so as to correspond to the three forming surfaces 73*i*, 73*j* and 73*k* respectively. These three vacuum chambers are disposed on the back side of the forming surface 73 so as to cover substantially entire region of the forming surface 73 of the mold 70, and the chambers are partitioned from one another by e.g. a wall to ensure complete air tightness. The vacuum chambers are connected with a chamber pressure controller 100 disposed outside the forming furnace 16 via respective ducts 82. FIG. 7 is a piping diagram which shows atmospheric pressure release lines in the main construction of the chamber pressure controller 100 (a constituent of the bending apparatus 10 of a glass sheet, disposed outside the forming furnace 16) according to another embodiment. Here, the piping diagram of the portion of the main construction of the chamber pressure controller 100 in the upstream side of the duct 80 is the same as that of FIG. 3, and thus, detailed explanation is omitted.

In this example, the vacuum chambers 80*i*, 80*j* and 80*k* are, via the respective ducts 82*i*, 82*j* and 82*k*, each connected with a vacuum source (low pressure source) 110, a blow source 120 and a cloth vacuum source 160 in the same manner as FIG. 3, and as shown in FIG. 7, connected with respective atmospheric pressure release lines 158. The atmospheric pressure release lines 158 are systems for releasing the vacuum chambers 80*i*, 80*j* and 80*k* to the atmospheric pressure so as to prevent occurrence of cloth mark of a glass sheet G.

Specifically, the atmospheric pressure release lines 158 are provided so as to branch from the respective ducts 82*i*, 82*j* and 82*k*, and connected with inside of the forming furnace 16 via respective open/close valves (damper) 168. Further, in each of the atmospheric pressure release lines 158, an atmospheric pressure release valve 180 is provided in a path between the duct 82*i*, 82*j* or 82*k* to the open/close valve 168. Namely, the vacuum chamber 80*i* is connected with inside of the forming furnace 16 via the duct 82*i*, the atmospheric pressure release line 158*i* and the open/close valve 168*i*, and in the atmospheric pressure release line 158*i*, an atmospheric pressure release valve 180*i* is provided. In the same manner, the vacuum chamber 80*j* is connected with inside of the forming furnace 16 via the duct 82*j*, the atmospheric pressure release line 158*j* and the open/close valve 168*j*, and in the atmospheric pressure release line 158*j*, an atmospheric pressure release valve 180*j* is provided. In the same manner, the vacuum chamber 80*k* is connected with inside of the forming furnace 16 via the duct 82*k*, the atmospheric pressure release line 158*k* and the open/close valve 168*k*, and in the atmospheric pressure release line 158*k*, an atmospheric pressure release valve 180*k* is provided.

"Releasing the vacuum chamber 80*i*, 80*j* or 80*k* of this example to an atmospheric pressure" means any one of the following two operations. First operation is to release the pressure of the vacuum chamber 80*i*, 80*j* or 80*k* to a pressure in the forming furnace 16. Another operation is to release the pressure of the vacuum chamber 80*i*, 80*j* or 80*k* to an atmospheric pressure outside the forming furnace 16. Communications of the vacuum chambers 80*i*, 80*j* and 80*k* with the respective atmospheric pressure release lines 158 are realized by closing the open/close valves 136, 146 and 156. Further, releasing of the vacuum chambers 80*i*, 80*j* and 80*k* to the pressure in the forming furnace 16 are achieved by closing the respective atmospheric pressure release valves 180 and closing the respective open/valves 168. Further, releasing the vacuum chambers 80*i*, 80*j* and 80*k* to the atmospheric pressure outside the forming furnace 16 is achieved by closing the respective atmospheric pressure release valves 180 and closing the respective open/valves 168. In a case where the suction valve 80*i*, 80*j* and 80*k* are not released to the atmospheric pressure, both of the respective open/close valves 168 and the respective atmospheric pressure release valves 180 are closed. Open/close control of the open/close valves 168 and 180 are carried out by the controller 190 in the same manner as the case of open/close control of the open/close valves 136, 146 and 156.

The bending method of a glass sheet achieved by the bending apparatus of the present invention, comprises a first stage in which a mold 70 moves down so that the central forming surface 73*k* (central portion of the forming surface 73 for carrying out the deepest drawing shown in FIG. 6) is pushed against a glass sheet G placed on a supporting frame 60, a second stage in which the mold 70 is at the final forming position (the lowest position), and a third stage in which the mold 70 moves up as the glass sheet G is suctioned and held by the mold 70 after the completion of forming.

Figure 8:
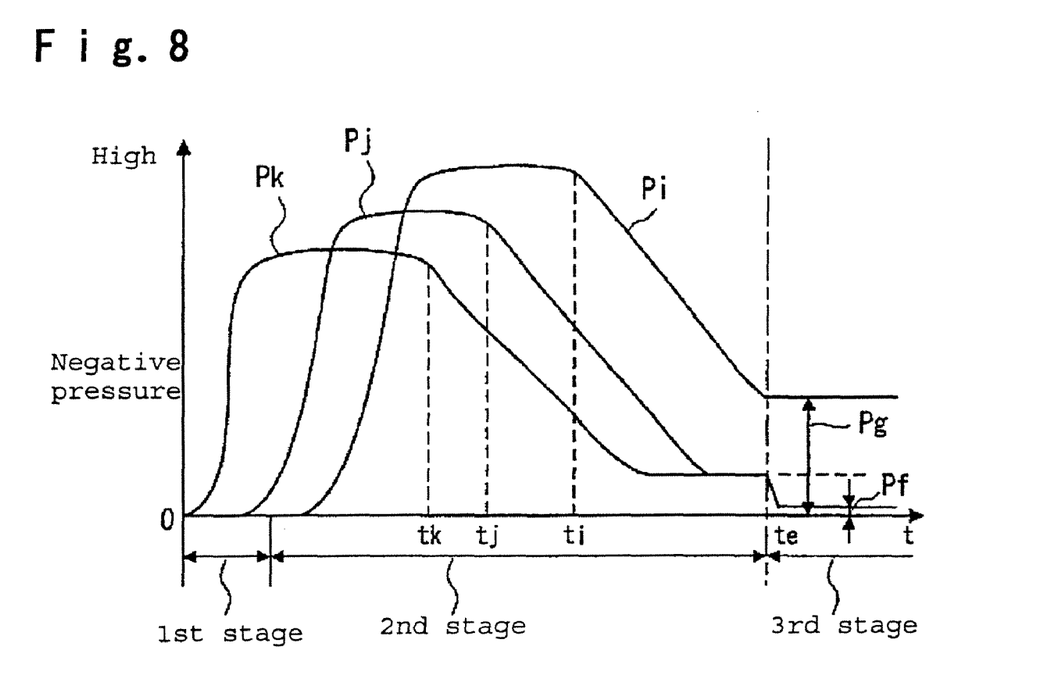
FIG. 8 is a graph sequentially showing the nature of change of negative pressures of the vacuum chambers 80i, 80j and 80k of another example of the present invention.

FIG. 8 sequentially shows the nature of change of negative pressures in the vacuum chambers 80*i*, 80*j* and 80*k* in the process from the first stage to the third stage. Horizontal axis (time axis) of FIG. 8 represents an example of time zones corresponding to the respective stages. In FIG. 8, Pi shows a negative pressure of the vacuum chamber 80*i*, Pj shows a negative pressure of the vacuum chamber 80*j*, and Pk shows a negative pressure of the vacuum chamber 80*k*. Here, the nature of the change of suction pressures applied to the glass sheet G via the suction holes 74 of the respective groups, are substantially the same as the nature of the change of the negative pressures of the vacuum chambers 80*i*, 80*j* and 80*k*.

First of all, the glass sheet G is passed from a flat mold 35 and placed on a support frame 60, and when the supporting frame 60 moves to a position opposed to the mold 70, the mold 70 starts moving down, and accordingly, a part of the glass sheet G supported by the supporting frame 60 is pressed against the forming surface 73*k* of the mold, whereby forming of the glass sheet G is started.

Approximately at the same time, (or from just before a part of the glass sheet G is pressed against the forming surface 73*k* of the mold 70), as shown in FIG. 8, negative pressure of the vacuum chamber 80*k* is increased, and the glass sheet G is suctioned against the forming surface 73k of the mold 70, whereby forming of the glass sheet G along the forming surface 73k of the mold 70 is facilitated.

Here, at this stage, to other vacuum chambers 80i and 80j, a cloth vacuum source 160 (refer to FIG. 7) is connected. Air suctioned by the cloth vacuum source 160 may be returned into the forming furnace 16 via a pipe 162 as shown in FIG. 7. This construction prevents high temperature outside the forming furnace, and is advantageous in terms of energy efficiency.

Then, when the mold 70 gradually moves down, as shown in FIG. 4(B), the mold 70 reaches the final forming position (the lowest position). The mold 70 is maintained at the final forming position for a predetermined time. Accordingly, substantially entire surface of the glass sheet G supported by the supporting frame 60 is pressed against the forming surface 73 of the mold, whereby the glass sheet G is entirely formed.

In this predetermined time (during the second stage), as shown in FIG. 8, first of all, negative pressure of the vacuum chamber 80j is increased. Then, vacuum pressure in the vacuum chamber 80i is increased. The glass sheet G is suctioned against the forming surfaces 73j and 73i of the mold 70, and forming of the glass sheet G along the forming surface 73 of the mold 70 is facilitated.

Further, since the time from the start of vacuum forming by the first vacuum chamber 80k to the completion of vacuum forming by the last vacuum chamber 80i becomes long, as shown in FIG. 8, at a timing (time tk of FIG. 8) at which the negative pressure of the vacuum chamber 80k is increased to a predetermined negative pressure for vacuum forming and a time required for vacuum forming elapses, the high negative pressure that has been introduced to the vacuum chamber 80b is weakened to the predetermined negative pressure range Ph (not shown in FIG. 8 but the same as FIG. 5) in the same manner as the above-mentioned example. The predetermined negative pressure range Ph is a negative pressure range not causing cloth mark of a glass sheet G by e.g. a cloth 75, and is for example, from −300 to −50 [mmAq]. In order to make the negative pressure quickly lower to the negative pressure range Ph, the negative pressure may be gradually lowered at a predetermined speed (for example, 333 mmAq/sec) by a regulator 152b.

In the same manner, at a timing (time tj of FIG. 8) at which the negative pressure of the vacuum chamber 80j is increased to a predetermined negative pressure for vacuum forming and a time required for vacuum forming elapses, the high negative pressure that has been introduced to the vacuum chamber 80j is weakened to the predetermined negative pressure range Ph in the same manner.

At a timing (time ti of FIG. 8) at which the negative pressure of the vacuum chamber 80i is increased to a predetermined negative pressure for vacuum forming and a time required for vacuum forming elapses, the high vacuum forming that has been introduced to the vacuum chamber 80i is lowered to a predetermined negative pressure Pg shown in FIG. 8. The negative pressure Pg is determined by e.g. weight of the glass sheet G, the negative pressure Pg applied to the peripheral portion of the glass sheet G supports the glass sheet G after forming.

Thus, the negative pressures of the vacuum chambers 80i, 80j and 80k are each lowered, and at least the negative pressures of the vacuum chambers 80j and 80k are maintained to a predetermined negative pressure range Ph until the negative pressure of the vacuum chamber 80i is lowered to the predetermined negative pressure Pg (at least until the time te of FIG. 8).

When the negative pressure of the vacuum chamber 80i lowers to the predetermined negative pressure Pg (time te of FIG. 8), the forming step is completed, and the mold 70 moves up as the formed glass sheet G is suctioned and held by the forming surface 73. Even in the state in which the glass sheet is suctioned and held, cloth mark of the glass sheet may still occur. In this example, in the third stage after the completion of forming step (time te of FIG. 8), vacuum chambers 80j and 80k are released to the atmospheric pressure to prevent cloth mark of the glass sheet.

After the completion of forming step (time te of FIG. 8), the negative pressure of the vacuum chambers 80j and 80k are further lowered and the glass sheet is suctioned and held by the mold 70 by a negative pressure Pg of the vacuum chamber 80i applied to the peripheral portion of the glass sheet G. Namely, an open/close valve 156b in the second negative pressure supply line 150b for the vacuum chamber 80k is closed, and an open/close valve 168k in the atmospheric pressure release line 168k for the vacuum chamber 80k is opened. At this time, the negative pressure of the vacuum chamber 80k is weakened to a pressure Pf close to the pressure in the forming furnace 16 via the atmospheric pressure release line 158k. Or else, configuration may be such that the open/close valve 168k in the atmospheric pressure release line 158k for the vacuum chamber 80k is closed and the atmospheric pressure release valve 180k is opened. In this case, the negative pressure of the vacuum chamber 80k is weakened to a pressure close to an atmospheric pressure outside the forming furnace 16 via the atmospheric pressure release line 158k.

In the same manner, an open/close valve 156c in the second negative pressure supply line 150c for the vacuum chamber 80j is closed and an open/close valve 168j in the atmospheric pressure release line 158j for the vacuum chamber 80j is opened. At this time, the negative pressure for the vacuum chamber 80j is weakened to a pressure Pf close to the pressure in the forming furnace 16 via the atmospheric pressure release line 158j. Or else, configuration may be such that an open/close valve 168j in the atmospheric pressure release line 158j for the vacuum chamber 80j is closed and an atmospheric pressure release valve 180j is opened. In this case, the negative pressure of the vacuum chamber 80j is weakened to a pressure close an atmospheric pressure outside the forming furnace 16 via the atmospheric pressure release line 158j.

Thus, the mold 70 suctions and holds the formed glass sheet G and transfers it to subsequent step (for example, quench ring) to complete forming operation to the glass sheet G. Specifically, open/close valves 168j and 168k in the atmospheric pressure release lines 158j and 158k for the vacuum chambers 80j and 80k are closed and atmospheric pressure release valves 180j and 180k are closed. Other configuration is in the same manner as the above-mentioned examples, and the vacuum chambers 80i, 80j and 80k communicate with positive pressure supply lines 130a, 130c and 130b respectively and positive pressure is introduced to the vacuum chamber 80i, 80j and 80k, whereby the glass sheet G that has been suctioned and held drops. At this time, the glass sheet G is received by e.g. a quench ring, that has been moved right under the mold 70, and conveyed to subsequent step.

As described above, according to this example, at the third stage after completion of forming step, a glass sheet G is suctioned and supported by a peripheral forming surface 73i corresponding to a black ceramic paste layer, whereby it is possible to further lower negative pressure applied to visible light transparent region of a glass sheet. As a result, it is possible to prevent cloth mark in the visible light transparent region of the glass sheet G. The shape of the peripheral forming surface 73*i* is not necessarily equal to the shape of the black ceramic paste layer, and the peripheral forming surface may occupy a region narrower than the black ceramic paste layer or in a region wider than the black ceramic paste layer to an extent not causing cloth mark.

Here, in this example, release of the vacuum chambers 80*j* and 80*k* to the atmospheric pressure are carried out at the same time in the third stage, but the timing of release is determined depending on minimum time required for realizing desired vacuum forming, and accordingly, release to the atmospheric pressure may start from sometime in the second stage depending on e.g. the shape of the forming surface of the mold 70, the magnitude of suction pressure by the vacuum chamber 80*i* or the weight of the glass sheet. Namely, the sequence may be such that the predetermined negative pressure in the vacuum chamber of the peripheral portion is set to be higher than Pg shown in FIG. 8 at the time of releasing the vacuum chamber of the central portion to the atmospheric pressure, and the negative pressure of the peripheral portion is lowered to Pg after the release to the atmospheric pressure.

Further, the mold 70 starts moving up in the third stage after completion of the forming step in this example, but the timing to start moving up the mold 70 may be in the middle of the second stage depending on the shape of a glass sheet to be formed, to reduce forming time, and thus, the timing is not necessarily in the third stage.

In the above, preferred examples of the present invention are described in detail, but the present invention is not limited to the above-mentioned examples, and various modifications or replacements may be made to the above-mentioned examples so long as it does not deviate from the scope of the present invention.

For example, in the above-mentioned examples, the vacuum chamber is divided into three vacuum chambers 80*a*, 80*b* and 80*c* or to 80*i*, 80*j* and 80*k*, but the vacuum chamber may be divided into two vacuum chambers or four or more vacuum chambers. For example, for a region of the forming surface 73 in which vacuum forming is particularly difficult, a vacuum chamber (not shown) may be provided for supplying still higher negative pressure. A duct 82*d* to be connected with this vacuum chamber may, for example, be configured so that it can selectively communicate with another negative pressure supply line 170 from the vacuum source 110 and another positive pressure supply line 130*d* from the blow source as shown in FIG. 3. In this case, said another negative pressure supply line 170 from the vacuum source 110 may supply a negative pressure adjusted to be a predetermined pressure (a negative pressure higher than those of other negative pressure supply lines, that is, for example, −3,000 mmAq) by a regulator 172.

Further, in the example shown in FIGS. 5 and 8, negative pressures maintained in respective buffer tanks 144*a*, 144*b* and 144*c* are made different so that negative pressures to be supplied to the respective vacuum chambers 80*a*, 80*b* and 80*c* or 80*i*, 80*j* and 80*k* for vacuum forming become different one another. However, the present invention is not limited to this construction and negative pressure for vacuum forming may be supplied from a common buffer tank to the vacuum chambers 80*a*, 80*b* and 80*c* or 80*i*, 80*j* and 80*k* via the respective independent negative pressure supply lines.

Further, in the above-mentioned examples, forming of a glass sheet is carried out in a furnace, but the forming may be carried out outside the furnace. Further, in the above-mentioned examples, subsequent step to the forming step by the forming apparatus 10 is a cooling step but another forming step may be carried out prior to the cooling step.

As described above, the present invention can be applied to not only forming of an window glass for automobiles but to forming of an window glass for, e.g. other vehicles, airplanes, ships or buildings. Further, to a case of forming a glass sheet G having a deeply curved shape by two or more stages consisting of a preliminarily forming and a main forming, the present invention can be applied to any of the preliminarily forming and the main forming.

The entire disclosure of Japanese Patent Application No. 2005-360902 filed on Dec. 14, 2005 including specification, claims, drawings and summary is incorporated herein by reference in its entirety.

What is claimed is:

1. A method of bending a glass sheet, comprising:
a heating step of heating the glass sheet to soften the glass sheet; and
a bending step of bending the heated and softened glass sheet to have a predetermined shape,
wherein the bending step comprises a step of pressing the heated and softened glass sheet whose edges are supported by a supporting frame against a forming surface of a mold opposed to the supporting frame, and a vacuum forming step of providing a negative pressure through a plurality of suction holes formed on the forming surface so that the shape of the pressed glass sheet is bent along the forming surface of the mold,
wherein, in the vacuum forming step, the plurality of suction holes are grouped into at least first and second groups and pressure of the first group is controllable independently of pressure of the second group, an amount of negative pressure of the first group is lowered at a first time, and an amount of negative pressure of the second group is lowered at a second time different from the first time, and
wherein, in the vacuum forming step, the negative pressures are lowered to a predetermined pressure at which the glass sheet G is suctioned and held.

2. The method of bending a glass sheet according to claim 1, wherein the negative pressure for the first group is lowered earlier than the negative pressure for the second group, and the negative pressure of the first group is subsequently maintained to be within a predetermined negative pressure range not causing a cloth mark on the glass sheet until a negative pressure for the second group is lowered.

3. The method of bending a glass sheet according to claim 1, wherein the vacuum forming step further comprises raising an amount of negative pressure of the first group at an initial time before the first time and raising an amount of negative pressure of the second group at a subsequent time after the initial time.

4. The method of bending a glass sheet according to claim 3, wherein said subsequent time occurs before said second time.

5. The method of bending a glass sheet according to claim 1, wherein the first and second groups include a central group of the forming surface of the mold and a peripheral group encompassing the central group, respectively, and
the negative pressure for the central group is lowered earlier than the negative pressure for the peripheral group, and the negative pressure of the central group is subsequently regulated to be maintained within a predetermined negative pressure range not causing a cloth mark on the glass sheet until the negative pressure for the peripheral group is lowered to a predetermined negative pressure latest of the first and second groups, and subsequently the negative pressure for the central group is released to a reduced negative pressure.

6. The method of bending a glass sheet according to claim 1, wherein the mold is maintained at a final forming position for a predetermined time.

7. A method of bending a glass sheet, comprising:
a heating step of heating the glass sheet to soften the glass sheet; and
a bending step of bending the heated and softened glass sheet to have a predetermined shape,
wherein the bending step comprises a step of pressing the heated and softened glass sheet whose edges are supported by a supporting frame against a forming surface of a mold opposed to the supporting frame, and a vacuum forming step of providing a negative pressure through a plurality of suction holes formed on the forming surface so that the shape of the pressed glass sheet is bent along the forming surface of the mold,
wherein, in the vacuum forming step, the plurality of suction holes are grouped into at least first and second groups and pressure of the first group is controllable independently of pressure of the second group, an amount of negative pressure of the first group is lowered at a first time, and an amount of negative pressure of the second group is lowered at a second time different from the first time, and
wherein after a predetermined negative pressure for vacuum forming and a time required for vacuum forming elapses, negative pressure of the first group is lowered to a predetermined negative pressure Pg which is determined by weight of the glass sheet G.

8. The method of bending a glass sheet according to claim 7, wherein the first and second groups include a central group of the forming surface of the mold and a peripheral group encompassing the central group, respectively, and
the negative pressure for the central group is lowered earlier than the negative pressure for the peripheral group, and the negative pressure of the central group is subsequently maintained to be within a predetermined negative pressure range not causing a cloth mark on the glass sheet until the negative pressure for the peripheral group is lowered to a predetermined negative pressure, and subsequently,
the negative pressure for the central group is released.

* * * * *